(12) United States Patent
Gu et al.

(10) Patent No.: US 12,448,528 B2
(45) Date of Patent: Oct. 21, 2025

(54) SILICA-BASED MATTING AGENTS AND METHODS OF MAKING AND USING THE SAME

(71) Applicant: W.R. Grace & Co.-Conn., Columbia, MD (US)

(72) Inventors: Feng Gu, Ellicott City, MD (US); James Neil Pryor, West Friendship, MD (US)

(73) Assignee: W.R. Grace & Co.-Conn., Columbia, MD (US)

( * ) Notice: Subject to any disclaimer, the term of this patent is extended or adjusted under 35 U.S.C. 154(b) by 633 days.

(21) Appl. No.: 17/426,440

(22) PCT Filed: Jan. 28, 2020

(86) PCT No.: PCT/US2020/015308
§ 371 (c)(1),
(2) Date: Jul. 28, 2021

(87) PCT Pub. No.: WO2020/159916
PCT Pub. Date: Aug. 6, 2020

(65) Prior Publication Data
US 2022/0186045 A1 Jun. 16, 2022

Related U.S. Application Data

(60) Provisional application No. 62/799,974, filed on Feb. 1, 2019.

(51) Int. Cl.
| | | |
|---|---|---|
| *C09D 7/42* | (2018.01) | |
| *C09C 1/30* | (2006.01) | |
| *C09C 3/10* | (2006.01) | |
| *C09D 7/20* | (2018.01) | |
| *C09D 7/62* | (2018.01) | |
| *C09D 15/00* | (2006.01) | |
| *C09D 133/00* | (2006.01) | |

(52) U.S. Cl.
CPC ............ *C09D 7/42* (2018.01); *C09C 1/3072* (2013.01); *C09C 3/10* (2013.01); *C09D 7/20* (2018.01); *C09D 7/62* (2018.01); *C09D 15/00* (2013.01); *C09D 133/00* (2013.01); *C01P 2004/61* (2013.01); *C01P 2006/12* (2013.01); *C01P 2006/14* (2013.01)

(58) Field of Classification Search
CPC ............... C09D 7/20; C09D 7/42; C09D 7/62
See application file for complete search history.

(56) References Cited

U.S. PATENT DOCUMENTS

| 5,221,337 A | 6/1993 | Luers et al. |
| 6,103,004 A * | 8/2000 | Belligoi ............... C12H 1/0424 |
| | | 106/482 |
| 7,612,137 B2 | 11/2009 | Brinkmann et al. |
| 8,926,748 B2 | 1/2015 | Lehnert et al. |
| 2005/0065268 A1 | 3/2005 | Morea-Swift et al. |
| 2010/0071593 A1 | 3/2010 | Lehnert et al. |
| 2013/0196848 A1 | 8/2013 | Kretzschmar et al. |
| 2015/0064719 A1 | 3/2015 | Hill |
| 2018/0066141 A1 | 3/2018 | Roland |

FOREIGN PATENT DOCUMENTS

| BR | 112020002310 | | 4/2020 | |
| CA | 3065173 A | | 12/2018 | |
| EP | 759959 B1 * | | 6/1998 | ........... C09C 1/3063 |
| EP | 3 917 674 A1 | | 12/2021 | |
| JP | H11-512124 A | | 10/1999 | |
| JP | 2005-509072 A | | 4/2005 | |
| JP | 2006-521411 A | | 9/2006 | |
| JP | 2010-521539 A | | 6/2010 | |
| JP | 2014-189687 A | | 10/2014 | |
| JP | 2014-529639 A | | 11/2014 | |
| WO | WO-2018/222960 A1 | | 12/2018 | |

OTHER PUBLICATIONS

Foreign Office Action on CN patent application No. 202080011788.X dated Aug. 26, 2022.
International Search Report and Written Opinion, PCT/US2020/015308 dated Apr. 22, 2020, 6 pages.
Written Opinion and Search Report on SG patent application No. 11202108095V dated Oct. 11, 2022.
Notice of Reasons for Rejection, JP 2021-544632, Nov. 13, 2023, 4 pages.
First Examination Report (FER) on IN patent application No. 202117032928 dated Feb. 17, 2023 (6 pages).
Office action for U.S. Appl. No. 17/426,440 mailed on Apr. 4, 2025, 5 pages.

* cited by examiner

*Primary Examiner* — Alexandre F Ferre
(74) *Attorney, Agent, or Firm* — DORITY & MANNING, P.A.

(57) ABSTRACT

Improved silica-based matting agents are disclosed. The matting agents are useful in waterborne coatings composition to provide exceptional properties to a wood based substrate. Films resulting from the silica-based matting agents on a wood substrate unexpectedly provide improved chemical resistance and/or film clarity to the surface of the wood substrate. Methods of making and using the silica-based matting agents are also disclosed.

19 Claims, No Drawings

SILICA-BASED MATTING AGENTS AND METHODS OF MAKING AND USING THE SAME

This application is being filed as the U.S. national stage patent application of PCT International Patent Application No. PCT/US2020/159916, filed on 28 Jan. 2020 and entitled "SILICA-BASED MATTING AGENTS AND METHODS OF MAKING AND USING THE SAME," which claims priority to U.S. Provisional Patent Application Ser. No. 62/799,974 filed on 1 Feb. 2019 and entitled "SILICA-BASED MATTING AGENTS AND METHODS OF MAKING AND USING THE SAME," the content of both of which is incorporated herein by reference in its entirety.

FIELD OF THE INVENTION

The present invention is directed to improved silica-based matting agents. In one aspect, the present invention relates to improved silica-based matting agents for waterborne coating systems. In another aspect, the invention relates to silica-based matting agents comprising composite silica particles, aqueous coating compositions containing the silica-based matting agents and methods of making and using the compositions.

BACKGROUND

Silica-based matting agents are widely used in coating and painting formulations to reduce the gloss of the coated films. In solvent based coating or 100% solid UV-cure formulations, high levels of silica are required for effective gloss reduction and matting. On the other hand, high concentration of hydrophilic silica can cause changes in the rheological properties of the solvent based lacquer and can often have dispensability and settling problems. To solve these problems, typically the prior art is targeted at treating the surface of particulate silica to make the surface thereof hydrophobic and thus more compatible with solvent systems and organics in the formulations. To this end, wax and/or polymer coated silicas have often been used.

U.S. Pat. No. 6,039,798 discloses wax coated silica matting agent wherein the silica is an amorphous silica having a pore volume of at least 1.5 $cm^3/g$, preferably at least 1.8 $cm^3/g$. The wax coating is present in the range from 6% to 15% by weight (wt %) of the matting agent and comprises a synthetic polyethylene wax.

EP0759959 discloses wax coated silica matting agent characterized in that the silica is an amorphous silica having a pore size distribution wherein 90% of the pores have a diameter above 15 nanometers, and less than 20% of the pore volume is in pores having a pore diameter between 10 and 30 nanometers, the wax coating being present in the range from about 2% to about 15% by weight of the matting agent and comprising a hard microcrystalline wax, a plasticizing microcrystalline wax, a synthetic polyethylene wax, or a mixture thereof.

US20050065268 discloses a silica matting agent comprises particulate amorphous silica in which the particles of silica have been treated with a hydrophilic polyolefin wax.

U.S. Pat. No. 6,921,781 discloses coating at least a portion of a surface of at least one silica particle with at least one wax, wherein the coating is carried out in at least one gas at a temperature above the melting point of the wax and below the decomposition temperature of the wax. The wax content is defined as 2-15% weight of that of silica.

U.S. Pat. No. 7,303,624 discloses a structurally coated silica can be prepared by spraying and mixing a pyrogenic silica with water and a coating agent in a suitable mixing vessel, then milling and then conditioning the product.

U.S. Pat. No. 8,926,748 discloses a matting agent useful for the preparation of matted coatings comprising, inorganic oxide particulates; and wax coated on the inorganic oxide particulates, wherein the wax possesses a crystallinity of about 50% or more and said wax is present in an amount ranging from 15 wt % to 30 wt % based on a total weight of said matting agent.

WO 1999051692 discloses an invention relating to a matting agent based on silicon dioxide, the silicon dioxide particles having a particle size of 2.5 to 20 μm and a moisture content of 0 to 65 wt %, based on the matting agent, and being coated with 0.2 to 10 wt % of a urea-urethane derivative or a mixture of urea-urethane derivatives.

Currently, solvent-based coating compositions are undesirable due to environmental concerns and safety and health issues. Government regulations have pushed for the reduction and elimination of volatile organic compounds (VOC) in paint or coating formulations and the use of substantially more waterborne coatings is promoted.

Various types of matting agents have been used in waterborne formulations, including, silica matting agents, organic matting agents, and blends of the two.

Silica-based matting agents such as ACEMATT® TS100, SYLOID® C807 have excellent matting efficiency, and film clarity in water borne formulations, but tend to have poorer chemical resistance and weather resistance, often whitening or turning cloudy when exposed to chemicals or changing weather conditions. Silica-based matting agents also tend to have poor thermal stress resistance when subjected to rapid change of temperatures. While not wishing to be bound by any particular theory, an adhesive failure at the matting agent-latex interface resulting in a fissure that is an effective scatter of light as well as adhesive failure caused by stresses due to swelling (then shrinkage) of the film during wetting and drying of the film and is aggravated by particle shrinkage of the matting particles during drying, may be the cause of these drawbacks with silica matting agents in waterborne coating formulation. All these drawbacks are undesirable in coating applications on wood substrates.

Pure organic based organic matting agents have also been used. For example, urea-formaldehyde resin based matting agents, such as DEUTERON® MK, and CERAFLOUR® 920 are known. However, both of these matting agents have environmental concerns since they can potentially release residual starting material, toxic formaldehyde. A modified, micronized polyethylene based matting agent CERAFLOUR® 929 is also available. However, this product has poor matting efficiency when compared to silica-based matting agents in coating formulations. It is also known that organic matting agents have poorer film clarity when compared to pure silica-based matting agents. This is probably due to the fact that silica-based matting agents have a refractive index close to that of other components (for example, binders) in the coated film, whereas the difference in the refractive index of organic based matting agents and such components is larger. In addition, organic matting agents are typically more difficult to produce and more expensive as well.

The blending of silica-based matting agents and organic matting agents has also been used in water borne systems to balance the required coating film properties. However, this creates additional complexity in already complicated paint or coating formulation systems.

Consequently, there remain a need for simple solutions to develop matting agents that (i) are suitable for use in aqueous coating systems, and (ii) provide clear coat films having improved chemical resistance and/or improved film clarity in combination with good matting efficiency.

SUMMARY

The present invention addresses the aforementioned need in the art by the discovery of improved silica-based matting agents, which provide good matting efficiency in combination with increased chemical resistance in a coated film resulting from "waterborne" or aqueous coating compositions. Unexpectedly, it has been found that the incorporation of composite silica/wax particles having a relatively low total porosity (e.g., less than 0.2 cubic centimeters per gram (cc/g)) and a relatively low final particle surface area (e.g., less than 10 meters squared per gram ($m^2/g$)) as matting agents in aqueous coating compositions provide increased chemical resistance in films formed from the dried coating composition, in particular, when applied onto a wood substrate. Advantageously, the aqueous compositions of the present invention also provide exceptional properties of improved film clarity to the surface of a wood substrate when compared to prior aqueous coated compositions.

Accordingly, the present invention provides silica-based matting agents comprising composite silica particles comprising: (a) porous silica particles; and (b) one or more waxes in an amount sufficient to at least partially fill pores of the porous silica particles such that the composite silica particles have (i) a total pore volume of less than 0.2 cc/g as determined by the Barrett-Joyner-Halenda (BJH) method and (ii) a final particle surface area of less than 10 meters squared per gram ($m^2/g$) as determined by Brunauer Emmet Teller (BET) nitrogen adsorption method.

In some desired embodiments, the silica-based matting agent comprises composite silica particles wherein the porous silica particles having an initial pore volume of from about 0.2 cc/g to about 2.5 cc/g as determined by the BJH method and an initial particle surface area of from about 100 $m^2/g$ to about 1000 $m^2/g$ as determined by the BET nitrogen adsorption method are coated or treated with one or more waxes in a manner such that the final composite silica particles have (i) a total pore volume of less than 0.2 cc/g as determined by BJH method, and (ii) a final particle surface area of less than 10 $m^2/g$ as determined by the BET nitrogen adsorption method. The composite silica particles typically comprise from about 15.0 weight percent (wt %) to about 65.0 wt %, based on a total weight of the composite silica particles, of the one or more waxes at least partially within pores of the porous silica particles.

The present invention also provides aqueous coating compositions or formulations comprising the improved silica-based matting agents of the invention which compositions, upon drying, provide dried "clear coat" films having improved chemical resistance and film clarity. For purposes of the invention, the term "clear coat" film is used herein to indicate a film which is transparent or substantially transparent such that the natural grain of a wood substrate is substantially visible to the human eye when applied onto at least one surface of a wood substrate. The coating compositions of the present invention provide films with improved chemical resistance and/or film clarity when compared to known coatings/films that do not contain the composite silica particle matting agents of the present invention.

The present invention is further directed to methods of making the composite silica particle matting agents and method of preparing aqueous coating compositions comprising the matting agents of the invention. The present invention is also directed to methods of coating a substrate with the herein-mentioned aqueous coating compositions. In a preferred embodiment, the substrate is a wood substrate.

In other embodiments, the method of using the herein-described composite silica particle matting agents comprises a method of improving the chemical resistance and/or film clarity, or any combination thereof, of a substrate, in particularly a wood substrate, wherein the method comprises incorporating the herein-described composite silica particle matting agents into an aqueous coating composition prior to applying the coating composition onto the substrate. Unexpectedly, the herein-described coating compositions provide improved protection to a given wood substrate, when compared to known liquid coating compositions as measured using a colorimeter (e.g., a portable Spectro-Guide 45/0 colorimeter).

The present invention is even further directed to substrates coated with aqueous compositions containing the herein-described composite silica particle matting agents. In some exemplary embodiments, the substrate comprises a wood substrate coated with aqueous compositions containing the herein-described composite silica particle matting agents.

These and other features and advantages of the present invention will become apparent after a review of the following detailed description of the disclosed embodiments and the appended claims.

DETAILED DESCRIPTION

To promote an understanding of the principles of the present invention, descriptions of specific embodiments of the invention follow and specific language is used to describe the specific embodiments. It will nevertheless be understood that no limitation of the scope of the invention is intended by the use of specific language. Alterations, further modifications, and such further applications of the principles of the present invention discussed are contemplated as would normally occur to one ordinarily skilled in the art to which the invention pertains.

It must be noted that as used herein and in the appended claims, the singular forms "a", "and", and "the" include plural referents unless the context clearly dictates otherwise. Thus, for example, reference to "an oxide" includes a plurality of such oxides and reference to "oxide" includes reference to one or more oxides and equivalents thereof known to those skilled in the art, and so forth.

"About" modifying, for example, the quantity of an ingredient in a coated particle and/or composition, concentrations, volumes, process temperatures, process times, recoveries or yields, flow rates, and like values, and ranges thereof, employed in describing the embodiments of the disclosure, refers to variation in the numerical quantity that may occur, for example, through typical measuring and handling procedures; through inadvertent error in these procedures; through differences in the ingredients used to carry out the methods; and like proximate considerations. The term "about" also encompasses amounts that differ due to aging of a formulation with a particular initial concentration or mixture, and amounts that differ due to mixing or processing a formulation with a particular initial concentration or mixture. Whether modified by the term "about", the claims appended hereto include equivalents.

As used herein, the term "crystalline" means a solid material whose constituent atoms, molecules, or ions are arranged in an ordered pattern extends in all three directions, which may be measured by X-ray diffraction or differential scanning calorimetry. As used herein, the term "amorphous" means a solid material whose constituent atoms, molecules, or ions are arranged in a random, non-ordered pattern extends in all three directions, which may be determined by X-ray diffraction or differential scanning calorimetry.

As used herein, the term "BET particle surface area" is defined as meaning a particle surface area as measured by the Brunauer Emmet Teller (BET) nitrogen adsorption method.

As used herein, the phrase "total pore volume" refers to the median pore volume of a plurality of particles (i.e., any particle, porous silica particles or composite silica particles, respectively) as determined using the Barrett-Joyner-Halenda (BJH) nitrogen porosimetry as described in DIN 66134.

As used herein, the phrase "median pore volume" refers to a pore volume size (V50, which is a pore volume distribution of various particles with 50 volume percent of the particles pore volume is smaller than this number and 50 volume percent of the particles pore volume is larger than this number in size) measured by Barrett-Joyner-Halenda (BJH) nitrogen porosimetry as described in DIN 66134.

As used herein, the phrase "particle size" refers to median particle size (D50, which is a volume distribution of various particles with 50 volume percent of the particles are smaller than this number and 50 volume percent of the particles are larger than this number in size) measured by dynamic light scattering when the particles are slurried in water or an organic solvent such as acetone or ethanol.

For purposes of this invention, the gloss values recited herein were measured when drawdowns of the aqueous coating compositions were carried out on a plain, smooth and non-penetrating black chart and dried at least for four (4) days at room temperature. All chemical resistance and film clarity values were also based on measurements on the black charts. Similar improvements were found on other types of substrates including wood.

The present invention is directed to improved silica-based matting agents that provide improved chemical resistance in films resulting from the application of an aqueous coating composition onto a substrate, preferably a wood substrate. Typically, the improved silica-based matting agents comprise composite silica particles having a low porosity, i.e. having a total pore volume of less than 0.2 cc/g as determined by the BJH method, and a final particle surface area of less than 10 $m^2/g$ as determined by the BET nitrogen adsorption method. The amount of the one or more waxes in the final composite silica particles will vary depending upon the starting porosity in porous silica used to prepare the composite silica particles. Typically, the one or more waxes is present in an amount sufficient to yield a composite silica particle having from about 15.0 wt % to about 65.0 wt %, based on a total weight of the composite silica particles.

In one desired embodiment of the invention, the matting agent comprises composite silica particles comprising porous silica particles treated with one or more waxes so as to provide composite silica particles having (i) a total pore volume of from about 0.00 cc/g to less than 0.20 cc/g, as determined by the BJH method, (ii) a final particle surface area of from about 0 $m^2/g$ to less than 10.0 $m^2/g$, as determined by the BET nitrogen adsorption method, and (iii) from about 15.0 wt % to about 65.0 wt %, based on a total weight of the composite silica particles, of one or more waxes at least partially within pores of the porous silica particles. Typically, the porous silica particles used to form the composite silica particles in this embodiment have an initial pore volume of from about 0.20 cc/g to about 2.50 cc/g, as determined by the BJH method.

In another desired embodiment, the silica-based matting agent comprises composite silica particles prepared from porous silica particles having an initial pore volume of from about 1.7 cc/g to about 2.2 cc/g as determined by the BJH method are coated or treated with one or more waxes in a manner such that the final composite silica particles have (i) a total pore volume of less than 0.2 cc/g as determined by BJH method, and (ii) a final particle surface area of less than 10 $m^2/g$ as determined by the BET nitrogen adsorption method. In this desired embodiment, the composite silica particles typically comprise from about 55.0 wt % to about 65.0 wt %, based on a total weight of the composite silica particles, of the one or more waxes at least partially within pores of the porous silica particles.

In another desired embodiment, the silica-based matting agent comprises composite silica particles prepared from porous silica particles having an initial pore volume of from about 1.2 cc/g to about 1.7 cc/g as determined by the BJH method are coated or treated with one or more waxes in a manner such that the final composite silica particles have (i) a total pore volume of less than 0.2 cc/g as determined by BJH method, and (ii) a final particle surface area of less than 10 $m^2/g$ as determined by the BET nitrogen adsorption method. In this desired embodiment, the composite silica particles typically comprise from about 45.0 wt % to about 55.0 wt %, based on a total weight of the composite silica particles, of the one or more waxes at least partially within pores of the porous silica particles.

In another desired embodiment, the silica-based matting agent comprises composite silica particles prepared from porous silica particles having an initial pore volume of from about 1.0 cc/g to about 1.2 cc/g as determined by the BJH method are coated or treated with one or more waxes in a manner such that the final composite silica particles have (i) a total pore volume of less than 0.2 cc/g as determined by BJH method, and (ii) a final particle surface area of less than 10 $m^2/g$ as determined by the BET nitrogen adsorption method. In this desired embodiment, the composite silica particles typically comprise from about 35.0 wt % to about 45.0 wt %, based on a total weight of the composite silica particles, of the one or more waxes at least partially within pores of the porous silica particles.

In another desired embodiment, the silica-based matting agent comprises composite silica particles prepared from porous silica particles having an initial pore volume of from about 0.6 cc/g to about 1.0 cc/g as determined by the BJH method are coated or treated with one or more waxes in a manner such that the final composite silica particles have (i) a total pore volume of less than 0.2 cc/g as determined by BJH method, and (ii) a final particle surface area of less than 10 $m^2/g$ as determined by the BET nitrogen adsorption method. In this desired embodiment, the composite silica particles typically comprise from about 25.0 wt % to about 35.0 wt %, based on a total weight of the composite silica particles, of the one or more waxes at least partially within pores of the porous silica particles.

In another desired embodiment, the silica-based matting agent comprises composite silica particles prepared from porous silica particles having an initial pore volume of from about 0.3 cc/g to about 0.6 cc/g as determined by the BJH method are coated or treated with one or more waxes in a manner such that the final composite silica particles have (i) a total pore volume of less than 0.2 cc/g as determined by BJH method, and (ii) a final particle surface area of less than 10 m²/g as determined by the BET nitrogen adsorption method. In this desired embodiment, the composite silica particles typically comprise from about 15.0 wt % to about 25.0 wt %, based on a total weight of the composite silica particles, of the one or more waxes at least partially within pores of the porous silica particles.

To form the composite silica particles, the porous silica particles are treated with one or more waxes in an amount sufficient to provide composite silica particles having (i) the desired low porosity, i.e. a total pore volume of less than 0.20 cc/g as determined by the BJH method, and (ii) the desired low final particle surface area, i.e., less than 10.0 m²/g, as determined by the BET nitrogen adsorption method. Typically, the composite silica particles comprise from about 15.0 wt % to about 65.0 wt %, based on a total weight of the composite silica particles, as described herein above. Typically, the one or more waxes is coated onto the porous silica particles in any amount sufficient to partially or substantially fill the pores of the porous silica particles so as to provide the desired low porosity in the composite silica particles, but not too much such that the one or more waxes fill the pores of the porous silica particles and start to accumulate along the outer surface of the resulting composite silica/wax particles.

Suitable porous silica particles useful in the preparation of the composite particle matting agents of the present invention include, but are not limited to, silica gel, precipitated silica, fumed silica and colloidal silica particles. Suitable porous silica particles also include, but are not limited to, ordered mesoporous silica particles prepared through an organic template (e.g., a surfactant) during the formation of silica particles, followed by a high temperature treatment to "burn off" the organics. Particularly preferred porous silica particles comprise silica gel or precipitated silica particles.

Preferred porous silica particles having a low porosity useful in the present invention include, but are not limited to, silica gels or precipitated silicas having BJH pore volumes of less than or equal to 2.5 cc/g, and in some embodiments, between about 0.2 cc/g up to about 2.5 cc/g. Commercially available porous silica particles useful in the present invention include particles available from W.R. Grace (Columbia, MD) under the trade designation SYLOID® such as SYLOID® C807 silica gel particles, SYLOID® C809 silica gel particles and SYLOID® MX106 precipitated silica particles, SYLOBLOC® silica particles, and DARACLAR® silica particles.

In a preferred embodiment, the porous silica particles used to form the matting agents of the present invention comprise porous silica particles having a purity of at least about 93.0% by weight $SiO_2$, or at least about 93.5% by weight $SiO_2$, at least about 94.0% by weight $SiO_2$, at least about 95.0% by weight $SiO_2$, at least about 96.0% by weight $SiO_2$, at least about 97.0% by weight $SiO_2$, or at least about 98.0% by weight $SiO_2$ up to 100% by weight $SiO_2$ based upon the total weight of the porous silica particle.

The porous silica particles used to form the matting agents of the present invention may have a variety of different symmetrical, asymmetrical or irregular shapes, including chain, rod or lath shape. The porous silica particles may have different structures including amorphous or crystalline, etc. In a preferred embodiment, the porous silica particles are amorphous. The porous silica particles may include mixtures of particles comprising different compositions, sizes, shapes or physical structures, or that may be the same except for different surface treatments. Porosity of the porous silica particles may be intraparticle or interparticle in cases where smaller particles are agglomerated to form larger particles.

The porous silica particles used to form the composite silica particles typically have an initial particle surface area of from about 100 m²/g to about 1000 m²/g, more typically, from about 200 m²/g to about 800 m²/g, as determined by the BET nitrogen adsorption method, while the composite silica particles used to form the matting agents of the present invention have a final BET particle surface area of from 0 m²/g to less than 10.0 m²/g (or any range of values between 0 m²/g and less than 10.0 m²/g, in increments of 0.1 m²/g, e.g., from about 0.1 m²/g to about 9.9 m²/g). In some embodiments, the composite silica particles have a final BET particle surface area of from about 1.0 m²/g up to about 9.0 m²/g (or any range of values between 1.0 m²/g and 9.0 m²/g, in increments of 0.1 m²/g, e.g., from about 1.0 m²/g to about 8.9 m²/g). In other embodiments, the composite silica particles used to form the matting agents of the present invention have a final BET particle surface area of from about 2.0 m²/g up to about 8.0 m²/g.

The porosity of the composite silica particles used to form the matting agent of the present invention is low, i.e. having a total pore volume of less than 0.2 cc/g, as determined by the BJH method. In one embodiment, the total pore volume of the composite silica particles is less than 0.19 cc/g. In a preferred embodiment, the composite particles have a total pore volume of about 0.001 to about 0.19 cc/g. In a more preferred embodiment, the total pore volume of the composite silica particles ranges from about 0.01 to about 0.05 cc/g.

The matting agents of the present invention typically have a median particle size of from about 1.0 micron (µm) to about 50.0 µm (or any range of values between and including 1.0 µm up to about 50.0 µm, in increments of 0.1 µm, e.g., from about 39.2 µm to about 49.1 µm). However, it should be understood that the matting agents of the present invention may have any median particle size depending on the use of the particles. In some embodiments, the matting agents of the present invention have a median particle size of from about 2.0 µm to about 20.0 µm. In some embodiments, the matting agents of the present invention have a median particle size of from about 3.0 µm to about 15.0 µm.

The one or more waxes may comprise, but are not limited to, a hydrocarbon wax (i.e., a wax comprising relatively long alkyl chains, e.g., alkyl chains having 20 or more carbon atoms therein, with or without one or more various functional groups such as fatty acids, primary and secondary long chain alcohols, unsaturated bonds, aromatics, amides, ketones, and aldehydes), a paraffin wax (i.e., from 20-40 carbon atoms without additional functional groups), a polyethylene wax, a polypropylene wax, a plant wax such as a carnauba wax (i.e., Brazil wax), an animal wax such as bee wax, or any combination thereof.

Commercially available waxes that are suitable for use in the present invention include, but are not limited to, waxes available from Mitsui Chemicals, LLC (Osaka, Japan) under the trade designations Hi-WAX™ or EXCEREX™ waxes, waxes available from Honeywell Performance Additives (Morristown, NJ) under the trade designations RHEOLUB® waxes; and waxes available from TH.C.TROMM GmbH (Cologne, Germany) under the trade designations POLARWACHS® waxes.

In some embodiments, the matting agent comprise composite silica particles comprising porous silica particles with a polyethylene wax, a polypropylene wax, or a combination thereof. In some desired embodiments, the composite particles comprise a polyethylene wax having an average molecular weight of at least 2000. Such a relatively high molecular weight polyethylene wax is commercially available from TH.C.TROMM GmbH (Cologne, Germany) under the trade designations POLARWACHS® wax.

Composite silica particles useful in the present invention may be prepared by contacting the porous silica particles with one or more waxes in a manner sufficient to provide composite particles having (i) a total pore volume of from about 0.00 cc/g to less than 0.20 cc/g (more typically, from about 0.001 cc/g to about 0.19 cc/g), as determined by the BJH method, (ii) a final particle surface area of from about 0 m$^2$/g to less than 10.0 m$^2$/g (more typically, from about 0.1 m$^2$/g to less than about 9.9 m$^2$/g), as determined by the BET nitrogen adsorption method, and (iii) from about 15.0 wt % to about 65.0 wt % (more typically, from about 22.0 wt % to about 63.8 wt %), based on a total weight of the composite silica particles, of one or more waxes at least partially within pores of the porous silica particles. Any conventional method may be used to contact the porous silica particles with one or more waxes so as to provide the composite silica particles. In some embodiments, the contacting step may be a wet process. The wet contacting process step may comprise dissolving or dispersing the one or more waxes in a solvent to form a solvent mixture; incorporating the porous silica particles into the solvent mixture; and removing or evaporating the solvent from the solvent mixture, to form the composite silica particles.

The composite silica particles may thereafter be subjected to size reduction. Any known method of reducing the particle size may be used, and include, but are not limited to, a milling step such as ball mill or a mortar pestle grinding step. In one embodiment, the composite silica particles are subjected to a size reduction step, wherein the median particle size of the composite silica particles is reduced to a first median particle size of less than about 500 microns (μm). Once reduced in size, the composite silica particles are desirably heat treated at an elevated temperature for a heat treatment period of time. Typically, the elevated temperature is from about 90° C. to about 140° C. (or any range of values between 90° C. up to and including 140° C., in increments of 1.0° C., for example, from about 91.0° C. to about 102.0° C.). Typically, the heat treatment period of time ranges from about 1.0 hour (hr) to about 4.0 hr (or any range of values between 1.0 hr up to and including 4.0 hr, in increments of 1.0 minute, for example, from about 1.0 hr and 9 minutes to about 2.0 hr and 5 minutes).

In one exemplary heat treatment step for forming composite silica particles of the present invention, the elevated temperature of the heat treatment step ranges from about 100° C. to about 130° C., and the heat treatment period of time ranges from about 1.0 hr to about 1.5 hr.

Following any optional heat treatment step, the heat-treated composite silica particles are allowed to cool. Once cooled, the heat-treated composite silica particles may optionally be further reduced in size so as to result in a final particle size of less than about 100.0 μm (or any range of values between about 1.0 μm up to and including 100.0 μm, in increments of 1.0 μm, for example, from about 4.0 μm to about 6.7 μm). As discussed above, any known method of reducing particle size may be used. In one exemplary embodiment, a milling step may be utilized so as to result in composite silica particles having a final particle size of less than about 45.0 μm.

In other exemplary embodiments, the contacting step may not involve any solvent and therefore be a dry process. In one embodiment, the dry process may comprise melting the one or more waxes to form a molten liquid; and incorporating the porous silica particles into the molten liquid, followed by particle size reduction. In yet other embodiments, the dry process may comprise simultaneously contacting and mixing (a) the one or more waxes, and (b) the porous silica particles in a conventional mixer such as a ribbon blender, a Henschel mixer, a twin screw extruder, a fluid energy mill (FEM) or a micronizing jet mill at high temperature (i.e., a temperature that melts any waxes if needed). In these embodiments, the heating and particle size reduction steps are combined and additional particle size reduction may or may not be necessary.

Coating Compositions

The matting agents of present invention are useful to prepare coating compositions comprising aqueous suspensions or dispersions of the herein-described composite silica particle matting agents. In a preferred embodiment, the coating composition is a waterborne or aqueous coating composition, which generally yields a clear coat film upon drying on a substrate. When the substrate is wood, the clear coat film allows the natural color and grain structure of wood, such as, teak, cherry, oak, walnut, mahogany and rose wood, to be visible or substantially visible to the eye, which characteristic may be highly prized in applications, such as, furniture and wood carvings.

The coating compositions may comprise the disclosed composite silica particle matting agents in addition to various other ingredients used in coating compositions. Examples of other ingredients that can be present in the compositions include, but are not limited to, an aqueous film-forming binder resin, such as a self-crosslinking modified acrylic copolymers emulsion or a latex acrylic binder NEOCRYL® XK12 (available from Royal DSM, Heerlen, the Netherlands), and a coalescent solvent such as dipropylene glycol n-butyl ether (DOWANOL™ PDnB). The composition may or may not contain color pigments such as organic pigments or titanium dioxide white inorganic pigments, provided that, where the substrate is wood, the natural grain of the word remains substantially visible to the eye. When the composition contains a color pigment, a dispersant may also be included in the formulation.

The balance of the composition is typically water. Other diluents can also be included, aside from water, including, but not limited to, aliphatics, aromatics, alcohols, ketones, white spirit, petroleum distillate, esters, glycol ethers, low-molecular weight synthetic resins, and the like. Environmentally friendly diluents, such as water, are preferred.

Other miscellaneous additives can also be included in the compositions, including without limitation, additives to modify surface tension, improve flow properties, improve finished appearance, increase wet edge, improve pigment stability, impart antifreeze properties, control foaming, control skinning, etc. Further additives that can be included in the compositions include without limitation surfactants, catalysts, thickeners, stabilizers, emulsifiers, texturizers, adhesion promoters, UV stabilizers, de-glossing agents, biocides to fight bacterial growth, and the like. Oil can be included as a rheology agent, gloss modifier and protective agent that will reduce damage to the coating that would otherwise result from forming processes and from degrative elements in the service environment of the coated materials.

The coating compositions of the present invention typically comprise (I) from about 1.0 wt % up to about 50.0 wt % (or any range of values between 1.0 wt % up to and including 50.0 wt %, in increments of 0.1 wt %, for example, from about 1.3 to about 4.8 wt %) of the composite silica particle matting agents, and (II) from about 99.0 wt % to about 50.0 wt % (or any range of values between 99.0 wt % to and including 50.0 wt %, in increments of 0.1 wt %, for example, from about 70.3 to about 44.8 wt %) of one or more additional components, with both weight percentages of components (I) and (II) being based on a total weight of the coating composition.

In some desired embodiments, the coating compositions of the present invention comprise (I) from about 2.0 wt % up to about 8.0 wt % (or any range of values between 2.0 wt % up to and including 8.0 wt %, in increments of 0.1 wt %, for example, from about 2.3 to about 4.8 wt %) of the composite silica particle matting agents, and (II) from about 98.0 wt % to about 92.0 wt % (or any range of values between 98.0 wt % to and including 92.0 wt %, in increments of 0.1 wt %, for example, from about 97.3 to about 96.8 wt %) of one or more additional components, with both weight percentages of components (I) and (II) being based on a total weight of the coating composition.

Uses

The present invention is even further directed to the use of the composite silica particle matting agents in various coating applications/processes. When used as a matting agent in coating compositions, the herein-described composite silica particles provide improved chemical resistance in addition to other desirable properties such as improved thermal stress resistance, improved weather resistance, improved film clarity, or any combination thereof in the final coating.

In a preferred embodiment, the composite silica particle matting agents of the invention are useful in methods of improving chemical resistance of a film resulting from an aqueous coating composition applied to a substrate. In another embodiment, the composite silica particle matting agents of the invention are useful in methods of improving chemical resistance simultaneously with improving film clarity of a clear cut film resulting from an aqueous film coating composition applied to a substrate.

In a particularly preferred embodiment, the substrate is a wood substrate. In one desired embodiment, a wood substrate is treated with an aqueous coating composition thereof, wherein the coating composition comprises the composite silica particle matting agents of the invention on a surface of the wood substrate. Other substrates which may be coated with coating compositions in accordance with the present invention include, but are not limited to, leather, plastics (e.g., vinyl), metal (e.g., coil) or metal alloys, cement or concrete or other industrial finishes.

Generally, the method of utilizing a matting agent in a coating composition in accordance with the invention comprises incorporating the inventive composite silica particle matting agents into a coating composition, preferably an aqueous coating composition, prior to applying the coating composition onto the substrate. The typical incorporation step includes mixing or dispersing the composite silica particle matting agents into the formulation. The method of applying the coating composition to a substrate includes brushing, rolling, air spraying, or drawdowning or other possible methods.

As discussed further in the examples below, incorporation of the composite silica particle matting agent of the current invention into an aqueous coating composition and subsequently applying the coating composition on a substrate with drying, provide coated films with improved chemical resistance alone or in combination with improved film clarity when compared to known coatings/films that do not contain the composite silica particle matting agents of the present invention.

For example, in some embodiments, a coating composition comprising the composite silica particle matting agents in an amount sufficient to achieve a 60° gloss value between 5.0 and 25.0 units, more preferably between 10.0 and 15.0 units (e.g., 12.5 units), in a dried film, results in a film, preferably a clear coat film, on a substrate, wherein the film exhibits a water damage 24 hr $\Delta L^*$ of less than 6.0 units (or any range of values less than 6.0 units, in increments of 0.1 units, for example, from about 0.0 units to about 1.5 units) as measured using a portable Spectro-Guide 45/0 colorimeter and the method described in the examples below.

In some embodiments, a coating composition comprising the composite silica particle matting agents of the invention in an amount sufficient to achieve a 60° gloss value between 5.0 and 25.0 units, more preferably between 10.0 and 15.0 units (e.g., 12.5 units), in a dried film, results in a film, preferably a clear coat film, on a substrate, wherein the film exhibits a 50/50 water/ethanol damage 24 hr $\Delta L^*$ of less than 6.5 units (or any range of values less than 6.5 units, in increments of 0.1 units, for example, from about 0.0 units to about 4.4 units) as measured using a portable Spectro-Guide 45/0 colorimeter and the method described in the examples below.

In some embodiments, a coating composition comprising the inventive composite silica particle matting agents in an amount sufficient to achieve a 60° gloss value between 5.0 and 25.0 units, more preferably between 10.0 and 15.0 units (e.g., 12.5 units), in a dried film, results in a film, preferably a clear coat film, on a substrate, and the film exhibits a 50/50 water/ethanol damage 1 hr $\Delta L^*$ of less than 4.0 units (or any range of values less than 4.0 units, in increments of 0.1 units, for example, from about 0.0 units to about 0.2 units) as measured using a portable Spectro-Guide 45/0 colorimeter and the method described in the examples below.

In some embodiments, a coating composition comprising the herein-described composite silica particle matting agents in an amount sufficient to achieve a 60° gloss value between 5.0 and 25.0 units, more preferably between 10.0 and 15.0 units (e.g., 12.5 units), in a dried film, results in a film, preferably a clear coat film, on a substrate, and the film exhibits a 50/50 water/ethanol damage 4 hr $\Delta L^*$ of less than 4.5 units (or any range of values less than 4.5 units, in increments of 0.1 units, for example, from about 0.0 units to about 0.5 units) as measured using a portable Spectro-Guide 45/0 colorimeter and the method described in the examples below.

In some desired embodiments, films having one or more of the above mentioned improvements in water and/or chemical resistance also exhibit a film clarity $\Delta L^*$ of less than 7.0 units (or any range of values less than 7.0 units, in increments of 0.1 units, for example, from about 1.2 units to about 5.0 units) as measured using a portable Spectro-Guide 45/0 colorimeter and the method described in the examples below.

In some desired embodiments, a coating composition comprising the herein-described composite silica particle matting agents in an amount sufficient to achieve a 60° gloss value of between 5.0 and 25.0 units, more preferably between 10.0 and 15.0 units (e.g., 12.5 units), in a dried clear coat film coated on a substrate, forms a film that exhibits one or more or all of: (a) a water damage 24 hr $\Delta L^*$ of less than 6.0 units (or any range of values less than 6.0 units, in increments of 0.1 units, for example, from about 0.0 units to about 1.5 units) as measured using a portable Spectro-Guide 45/0 colorimeter and the method described in the examples below, (b) a 50/50 water/ethanol damage 24 hr $\Delta L^*$ of less than 6.5 units (or any range of values less than 6.5 units, in increments of 0.1 units, for example, from about 0.0 units to about 4.0 units) as measured using a portable Spectro-Guide 45/0 colorimeter and the method described in the examples below, (c) a 50/50 water/ethanol damage 1 hr ΔL* of less than 4.0 units (or any range of values less than 4.0 units, in increments of 0.1 units, for example, from about 0.0 units to about 1.8 units) as measured using a portable Spectro-Guide 45/0 colorimeter and the method described in the examples below, (d) a 50/50 water/ethanol damage 4 hr ΔL* of less than 4.5 units (or any range of values less than 4.5 units, in increments of 0.1 units, for example, from about 0.0 units to about 0.5 units) as measured using a portable Spectro-Guide 45/0 colorimeter and the method described in the examples below, and (e) a film clarity ΔL* of less than 7.0 units (or any range of values less than 7.0 units, in increments of 0.1 units, for example, from about 1.2 units to about 5.0 units) as measured using a portable Spectro-Guide 45/0 colorimeter and the method described in the examples below.

In other desired embodiments, a coating composition comprising the herein-described composite silica particle matting agents in an amount sufficient to achieve a 60° gloss value of between 5.0 and 25.0 units, more preferably between 10.0 and 15.0 units (e.g., 12.5 units), in a dried clear coat film coated on a substrate, forms a film that exhibits one or more or all of (a) a water damage 24 hr ΔL* of less than 4.1 units (or any range of values less than 4.1 units, in increments of 0.1 units, for example, from about 0.0 units to about 0.2 units) as measured using a portable Spectro-Guide 45/0 colorimeter and the method described in the examples below, (b) a 50/50 water/ethanol damage 24 hr ΔL* of less than 4.0 units (or any range of values less than 4.0 units, in increments of 0.1 units, for example, from about 0.0 units to about 0.2 units) as measured using a portable Spectro-Guide 45/0 colorimeter and the method described in the examples below, (c) a 50/50 water/ethanol damage 1 hr ΔL* of less than 3.0 units (or any range of values less than 3.0 units, in increments of 0.1 units, for example, from about 0.0 units to about 1.8 units) as measured using a portable Spectro-Guide 45/0 colorimeter and the method described in the examples below, (d) a 50/50 water/ethanol damage 4 hr ΔL* of less than 4.2 units (or any range of values less than 4.2 units, in increments of 0.1 units, for example, from about 0.0 units to about 0.5 units) as measured using a portable Spectro-Guide 45/0 colorimeter and the method described in the examples below, and (e) a film clarity ΔL* of less than 6.5 units (or any range of values less than 6.5 units, in increments of 0.1 units, for example, from about 1.2 units to about 5.0 units) as measured using a portable Spectro-Guide 45/0 colorimeter and the method described in the examples below.

In yet other desired embodiments, a coating composition comprising the herein-described composite silica particle matting agents in an amount sufficient to achieve a 60° gloss value of between 5.0 and 25.0 units, more preferably between 10.0 and 15.0 units (e.g., 12.5 units), in a dried clear coat film coated on a substrate, forms a film that exhibits one or more or all of (a) a water damage 24 hr ΔL* of less than 1.5 units (or any range of values less than 1.5 units, in increments of 0.1 units, for example, from about 0.0 units to about 0.2 units) as measured using a portable Spectro-Guide 45/0 colorimeter and the method described in the examples below, (b) a 50/50 water/ethanol damage 24 hr ΔL* of less than 1.0 units (or any range of values less than 1.0 units, in increments of 0.1 units, for example, from about 0.0 units to about 0.2 units) as measured using a portable Spectro-Guide 45/0 colorimeter and the method described in the examples below, (c) a 50/50 water/ethanol damage 1 hr ΔL* of less than 1.0 units (or any range of values less than 1.0 units, in increments of 0.1 units, for example, from about 0.0 units to about 0.5 units) as measured using a portable Spectro-Guide 45/0 colorimeter and the method described in the examples below, (d) a 50/50 water/ethanol damage 4 hr ΔL* of less than 1.0 units (or any range of values less than 1.0 units, in increments of 0.1 units, for example, from about 0.0 units to about 0.5 units) as measured using a portable Spectro-Guide 45/0 colorimeter and the method described in the examples below, and (e) a film clarity ΔL* of less than 6.1 units (or any range of values less than 6.1 units, in increments of 0.1 units, for example, from about 1.2 units to about 5.0 units) as measured using a portable Spectro-Guide 45/0 colorimeter and the method described in the examples below.

While not wishing to be bound by any particular theory, it is hypothesized that the improved properties of chemical resistance attributable to the improved composite silica particle matting agents, and resulting compositions and films, may be due to one or more of the following factors: 1) the coated wax at least partially fill the pores of the porous silica particles and which provides a reduction of particle shrinkage during exposure to the solvent and drying; 2) the coated wax leads to improved adhesion between matting particle and the latex; 3) the coated wax has the ability for wax coating to better flow and fill in cracks as they form; 4) the coated wax leads to reduced stress on the latex-particle interface due to the softening of the latex in the region surrounding the particle, 5) diffusion of the wax into at least some of the pores of the film, thereby reducing penetration of water, ethanol or other solvent into the film, and 6) the coated wax at least partially fills the pores of the porous silica particles but is not in excess so as to further coat the outer surface of the porous silica particles.

It should be understood that although the above-described composite silica particle matting agents, methods and uses are described as "comprising" one or more components or steps, the above-described composite silica particles, methods and uses may "comprise," "consists of," or "consist essentially of" any of the above-described components or steps of the composite silica particles, methods and uses. Consequently, where the present invention, or a portion thereof, has been described with an open-ended term such as "comprising," it should be readily understood that (unless otherwise stated) the description of the present invention, or the portion thereof, should also be interpreted to describe the present invention, or a portion thereof, using the terms "consisting essentially of" or "consisting of" or variations thereof as discussed below.

As used herein, the terms "comprises," "comprising," "includes," "including," "has," "having," "contains", "containing," "characterized by" or any other variation thereof, are intended to encompass a non-exclusive inclusion, subject to any limitation explicitly indicated otherwise, of the recited components. For example, a composite silica particle, method and/or use that "comprises" a list of elements (e.g., components or steps) is not necessarily limited to only those elements (or components or steps), but may include other elements (or components or steps) not expressly listed or inherent to the composite silica particle, method and/or use.

As used herein, the transitional phrases "consists of" and "consisting of" exclude any element, step, or component not specified. For example, "consists of" or "consisting of" used in a claim would limit the claim to the components, materials or steps specifically recited in the claim except for impurities ordinarily associated therewith (i.e., impurities within a given component). When the phrase "consists of" or "consisting of" appears in a clause of the body of a claim, rather than immediately following the preamble, the phrase "consists of" or "consisting of" limits only the elements (or components or steps) set forth in that clause; other elements (or components) are not excluded from the claim as a whole.

As used herein, the transitional phrases "consists essentially of" and "consisting essentially of" are used to define composite silica particles, methods and/or uses that include materials, steps, features, components, or elements in addition to those literally disclosed, provided that these additional materials, steps, features, components, or elements do not materially affect the basic and novel characteristic(s) of the claimed invention. The term "consisting essentially of" occupies a middle ground between "comprising" and "consisting of".

The present invention is further illustrated by the following examples, which are not to be construed in any way as imposing limitations upon the scope thereof. On the contrary, it is to be clearly understood that resort may be had to various other embodiments, modifications, and equivalents thereof which, after reading the description herein, may suggest themselves to those skilled in the art without departing from the spirit of the present invention and/or the scope of the appended claims.

EXAMPLES

The following examples describe (i) processes in accordance with the present invention for preparing composite silica particles, and (ii) the evaluation of the composite silica particles in coating compositions.

Draw down procedures and gloss (Matting efficiency), Film Clarity and Chemical Resistance Measurement Methods used in the examples were as follows:

Drawdown Procedure and Drawdown Cards

Drawdowns were carried out with a wire wound lab rod from Gardner Company with wire size of 40. With this size, the wet film thickness was about 100 µm. After drying, the dry film thickness was around 30-35 µm. The drawdown plates used were 219×286 mm² plain black charts from Leneta Company, Inc. (Mahwah, NJ). The procedure for each drawdown was as follows:
  1. In a dust free clean room, a blank drawdown plate was placed on a vacuum holder.
  2. Using a pipette, about 2-5 ml of a well-mixed coating composition sample was positioned on and near the top of a sample sheet.
  3. The ends of the drawdown rod were immediately grasped. Using the thumbs of both hands to keep the rod from bowing or bending away from the sample, the drawdown rod was drawn down through the liquid pool, spreading and metering the fluid across the sample sheet. After a given drawdown was made, the drawdown rod was immersed in a cleaning tray after use.
  4. After the drawdown, the drawdown samples were left at room temperature for at least four days to allow complete drying of the coated layer.
  5. After the coated drawdown plate was dry, chemical resistance, film clarity, matting efficiency and cold check tests were carried out using the procedures below.

Gloss (Matting Efficiency), Film Clarity and Chemical Resistance Measurement and Test Methods:

A portable Micro-TRI-Gloss meter (from BYK-Gardner USA, Columbia, MD) was used for film gloss reading. 60° gloss values were measured and reported.

For film clarity and chemical damage check, a portable Spectro-Guide 45/0 colorimeter (also from BYK-Gardner) was used. The L* values were obtained by readings of the colorimeter on a given coated film. On the card with black background, unmatted stock solution (from Example 6) gave an L* value of around 7.9. The addition of a matting agent (e.g., composite silica particles of the present invention or comparative commercially available matting agents) in the stock solution made the film whiter (i.e., resulting in a higher L* value) and the film clarity matted film was defined as the difference between the new L* value and the L* value from the film formed out of the stock solution containing no matting agent.

Chemical Resistance test methods used were similar to European standard specifications EN 12720/DIM 68861-1. Resistances towards deionized water and 50/50 ethanol in water were tested. The test were carried out as follows
  1. Circles (1 inch in diameter) were cut out of a Fisher-brand filter paper.
  2. Circles were soaked in either water or 50/50 ethanol/water for 30 seconds.
  3. Each soaked circle was placed onto a dried drawdown card, and then covered with a weighing boat to prevent evaporation.
  4. After a certain amount of time (i.e., 24 hours for water test, and 1 hour and 4 hours for the 50/50 ethanol in water), the weighing boat and paper were removed.
  5. A white mark in the contact area developed over time, and after overnight, the L* values were measured using the Spectro-Guide 45/0 colorimeter.
  6. The chemical damage (inversely related to the chemical resistance) was defined as the difference between the L* value of the white mark (i.e., the largest reading out of at least three readings) and surrounding undamaged background of the film. The percentage of change was also calculated.

Formation of A Stock Solution for Testing of Coating Compositions

The components listed in Table 1 below were combined as described below to form a stock solution for testing coating compositions as discussed below.

TABLE 1

Stock Solution For Testing of Coating Compositions

| Raw Material | Supplier | Weight (g) | Comments |
| --- | --- | --- | --- |
| NEOCRYL ® KX12 | DSM | 77.43 | Acrylic Emulsion |
| Deionized Water | | 11.07 | |
| DOWANOL ™ PDnB | Dow Chemical | 8.85 | Coalescent |
| BYK ® 024 | BYK | 0.55 | Defoamer |
| SURFYNOL ® 104E | Air Products | 1.11 | Wetting and Defoamer |
| RHEOLATE ® 299 | Elementis | 0.22 | Rheolate |
| BYK ® 346 | BYK | 0.77 | |

77.43 grams (g) of NEOCRYL® KX12 and 5.53 g of deionized water were mixed in a first container. 8.85 g of DOWANOL™ PDnB and 5.54 g of deionized water were mixed in a second container. Then, the contents of the second container were slowly poured into the first container. The mixture was dispersed at 1500 rpm for 15 minutes using a DISPERMAT® disperser from Gardner Company (Pompano Beach, FL) with a 30 mm wide blade.

0.55 g of BYK® 024, 1.11 g of SURFYNOL® 104E and 0.22 g of RHEOLATE® 299 were added to the mixture in the first container. The mixture was then dispersed at 2500 rpm for 10 minutes using the DISPERMAT® disperser.

0.77 g of BYK® 346 was added to the mixture in the first container. The mixture was then dispersed at 1000 rpm for 5 minutes using the DISPERMAT® disperser. The resulting mixture then was used as a stock solution, capable of being stored for up to 1 month.

Formation of Coating Compositions Comprising a Matting Agent and the Stock Solution Coating compositions comprising a matting agent (e.g., composite silica particles of the present invention or comparative commercially available matting agents) and the stock solution were prepared as follows. The goal of using matting agent was to lower the gloss of the coated film, and obtain a target 60° gloss range of between 10.0 and 15.0, or close to 12.5. To achieve this level of gloss, the required amounts of matting agents varied for different samples and were determined from a separate loading study. After a given amount of matting agent was added into a given amount of stock solution formed as described in the procedure above, the resulting mixture was dispersed at 2500 rpm for 30 min using the DISPERMAT® disperser, and then allowed to sit overnight at room temperature.

Drawdowns for testing each coating composition were carried out the second day (i.e., the day after making a given coating composition) using the drawdown procedure described above.

Nitrogen Pore Volume and BET Surface Area Measurements of Composite Particle Samples Nitrogen pore volumes of the composite silica particles, prepared as described in Examples below, were measured using an Autosorb® iQ analyzer, available from Quantachrome Instrument (Boynton Beach, FL). The degassing for each sample was carried out at 65° C. (i.e., below the melting temperature of the wax of around 80° C.) for 4 hours. Nitrogen adsorption and desorption isotherms were measured at 77K with nitrogen pressure increasing from 0.01% atmosphere to 0.998% atmosphere, and subsequently decreasing from 0.998% atmosphere to 0.025% atmosphere, respectively. The pore volumes were calculated using the AsiQwin™ 5.0 version program based on BJH theory. See, for example, Barrett et al., *The Determination of Pore Volume and Area Distributions in Porous Substances. I. Computations from Nitrogen Isotherms*, J. Am. Chem. Soc., 1951, 73 (1), pp 373-380, and the BET surface area were also calculations based on the the Brunauer Emmet Teller method (Brunauer, et al., "*Adsorption of Gases in Multimolecular Layers*". J. Am. Chem. Soc. 1938, 60 (2): 309-319). Subject matter of which is incorporated herein by reference in its entirety. The measured pore volumes and BET surface areas for the composite silica particles were summarized in Tables 2 and 4.

General Method for the Formation of Composite Silica/Wax Particles 1-10 grams of polyethylene wax were dissolved in 60-100 ml of toluene with heating. 10 g of porous silica particles were mixed with the wax solution. The mixture was left in a crystallizing dish in a well ventilated fume hood overnight to allow all of the solvent to evaporate. The "dried" residue was subjected to mortar pestle grinding to allow all the particles to pass a 500 μm screen. The screened particles were then subsequently heated at 120° C. for 1 hour. After drying, the composite silica particles were cooled down to room temperature and the particle size was further reduced with an analytical mill to enable the composite silica particles to pass a 45 μm screen (325 mesh). The screened composite silica particles were suitable for use, as is, directly in, for example, a paint formulation.

Examples 1-8

In order to evaluate the effectiveness of composite silica/wax particle matting agents at wax levels higher than 50 wt %, based on a total weight of the composite silica/wax particles, examples were prepared using the procedure as described above. Each example was subsequently tested for chemical resistance and chemical damage.

In Examples 1-8, porous silica gel particles with an initial pore volume of around 1.87 cc/g and a median particle size of around 9 μm were treated with different amount of waxes (from 50 wt % to 75 wt %) and loaded in the stock solution described above. Table 2 below lists the results of these samples.

TABLE 2

Samples with Higher Amount of Waxes

| Example No. | Wax Levels (%) | Median Particle size (μm) | BET Surface Area of the Composites (m²/g) | Pore Volume of the Composites (cc/g) |
| --- | --- | --- | --- | --- |
| 1 | 50 | 6.04 | 42 | 0.30 |
| 2 | 52.5 | 5.97 | 32.4 | 0.22 |
| 3 | 55 | 5.84 | 21.5 | 0.14 |
| 4 | 58 | 5.84 | 13.9 | 0.12 |
| 5 | 60 | 6.05 | 5.4 | 0.03 |
| 6 | 65 | 40.1 (difficult to screen) | 0.6 | 0.00 |
| 7 | 70 | Difficult to screen | 0 | 0.00 |
| 8 | 75 | Difficult to screen | 0 | 0.00 |

As shown in Table 2, starting with a silica pore volume of 1.87 cc/g, there is a gradual reduction of total pore volume and final BET surface areas with increased amount of wax levels, and at around 60% wax, the pore volume is close to zero while the final BET falls below 10.0 m²/g. Over 60 wt %, it was found that the sample preparation became problematic, as shown in Table 2, and that for 65 wt % wax, the particle size for the product was rather large at 40.0 μm, and at 70 wt % and over 70 wt %, the composite silica particles could not be screened. Although not wish to be bounded with theory, it is believed that extra amount of wax, after the starting pores have be completely filled (pore volume of very close to zero), will stay outside the composite silica particles and these waxes would behave like sticky glue to hold all the composite silica particles together.

The evaluation results of samples in Examples 1-6 were listed in Table 3.

TABLE 3

Evaluation Results for Examples 1-6

| Example No. | Median PS (um) | Wax Levels (%) | Loading (%) | 60° Gloss | Water (24 hrs) | Chemical Damage (ΔL *) Ethanol/Water (1 hr) | Ethanol/Water (4 hrs) | Film Clarity |
|---|---|---|---|---|---|---|---|---|
| 1 | 6.04 | 50 | 6.19 | 12.5 | 1.28 | 3.6 | 4.0 | 5.5 |
| 2 | 5.97 | 52.5 | 6.35 | 12.5 | 0.95 | 3.2 | 3.5 | 5.6 |
| 3 | 5.84 | 55 | 6.71 | 12.5 | 0.60 | 1.4 | 1.9 | 5.8 |
| 4 | 6.07 | 58 | 5.96 | 12.5 | 0.72 | 1.2 | 1.5 | 6.1 |
| 5 | 6.05 | 60 | 6.64 | 12.5 | 0.02 | 0.0 | 0.0 | 6.1 |
| 6 | 40.1 | 65 | 6.58 | 12.5 | 0.73 | 0.4 | 1.5 | 8.5 |

As shown, with higher amount of waxes and reduced levels of pore volume for the composite silica/wax particle matting agents, the chemical damage goes down. At around 60 wt % wax with close to zero pore volume, Example 5 shows essentially zero damage. For the 65 wt % wax sample (Example 6), the chemical damage was worse than Example 5, and also the film clarity for this one was much worse as well.

Comparative Example 9

For Comparative Example 9, commercially available pure wax based matting agent CERAFLOUR® 929 was used as the matting agent. The chemical damage data from this comparative example is shown below in Table 4.

TABLE 4

Comparison of Silica/Wax Composite Particles to Pure Wax Commercial Product

| Example No. | Comments | Particle Size (μm) | Load (%) | 60° Gloss | Water (24 hrs) | Chemical Damage (ΔL *) Ethanol/Water (1 hr) | Ethanol/Water (4 hrs) | Film Clarity |
|---|---|---|---|---|---|---|---|---|
| 5 | Silica/60% wax | 5.60 | 7.05 | 12.5 | 0.2 | 0.0 | 0.0 | 6.0 |
| 9 | CERAFLOUR® 929 | 7.70 | 7.11 | 12.5 | 0.0 | 0.0 | 0.0 | 6.8 |

As shown, the 60 wt % silica/wax composite silica particles showed similar performance as that of pure wax based matting agents, with the 60 wt % composite silica particle matting agent having advantages over the commercially available matting agent (e.g., a lower wax content requirement to reach 12.5 gloss, and better film clarity (i.e., lower ΔL* value)).

Examples 10-13

In Examples 10-13, porous silica particles having a lower initial pore volume were selected as starting materials for wax coating and performance comparison.

In Example 10, porous silica gel particles with an initial pore volume of around 1.14 cc/g and a median particle size of around 7.0 μm were used.

In Example 11, the porous silica particles from Example 10 were used as starting material, and these particles were coated with 30 wt % polyethylene (PE) wax.

In Example 12, the porous silica particles from Example 10 were used as starting material, and these particles were coated with 40 wt % PE wax.

In Example 13, the porous silica particles from Example 10 were used as starting material, and these particles were coated with 50 wt % PE wax.

The following Table 5 lists the physical properties and evaluation results for these examples.

TABLE 5

Low Pore Volume Porous Silica Particles and Their Wax Coated Samples

| Example No. | Wax Levels (wt %) | Median PS (μm) | Measured BET (m²/g) | Measured PV (cc/g) | Loading (%) | Gloss of Film | ΔL* (water, 24 hrs) | ΔL* (ethanol/water, 24 hrs) |
|---|---|---|---|---|---|---|---|---|
| 10 | 0 | 8.02 | 306 | 1.14 | 3.36 | 12.5 | 7.4 | 15.2 |
| 11 | 30 | 5.44 | 98 | 0.41 | 5.65 | 12.5 | 3.9 | 6.9 |
| 12 | 40 | 6.05 | 56 | 0.27 | 5.74 | 12.5 | 4.1 | 6.5 |
| 13 | 50 | 6.12 | 5.7 | 0.03 | 7.13 | 12.5 | 0.4 | 0.3 |

While the invention has been described with a limited number of embodiments, these specific embodiments are not intended to limit the scope of the invention as otherwise described and claimed herein. It may be evident to those of ordinary skill in the art upon review of the exemplary embodiments herein that further modifications, equivalents, and variations are possible. All parts and percentages in the examples, as well as in the remainder of the specification, are by weight unless otherwise specified. Further, any range of numbers recited in the specification or claims, such as that representing a particular set of properties, units of measure, conditions, physical states or percentages, is intended to literally incorporate expressly herein by reference or otherwise, any number falling within such range, including any subset of numbers within any range so recited. For example, whenever a numerical range with a lower limit, $R_L$, and an upper limit $R_U$, is disclosed, any number R falling within the range is specifically disclosed. In particular, the following numbers R within the range are specifically disclosed: $R=R_L+k(R_U-R_L)$, where k is a variable ranging from 1% to 100% with a 1% increment, e.g., k is 1%, 2%, 3%, 4%, 5% . . . . 50%, 51%, 52% . . . . 95%, 96%, 97%, 98%, 99%, or 100%. Moreover, any numerical range represented by any two values of R, as calculated above is also specifically disclosed. Any modifications of the invention, in addition to those shown and described herein, will become apparent to those skilled in the art from the foregoing description and accompanying drawings. Such modifications are intended to fall within the scope of the appended claims. All publications cited herein are incorporated by reference in their entirety.

What is claimed is:

1. A matting agent for aqueous coating compositions comprising composite silica particles, wherein the composite silica particles have a total pore volume of less than 0.20 cc/g as determined by Barrett-Joyner-Halenda (BJH) method and a final particle surface area of less than about 10 m²/g as determined by Brunauer Emmet Teller (BET) nitrogen adsorption method, said composite silica particles comprising:
   (a) porous silica particles; and
   (b) one or more waxes in an amount sufficient to at least partially fill pores of the porous silica particles.

2. The matting agent of claim 1, wherein the porous silica particles have an initial pore volume of from about 0.20 cc/g to about 2.50 cc/g as determined by Barrett-Joyner-Halenda (BJH) method.

3. The matting agent of claim 2, wherein said composite silica particles comprise from about 15.0 wt % to less than about 65.0 wt % of said one or more waxes, based on a total weight of said composite silica particles.

4. The matting agent of claim 1, wherein the porous silica particles have an initial particle surface area of from about 100 m²/g to about 1000 m²/g as determined by the BET nitrogen adsorption method.

5. The matting agent of claim 1, wherein
   (a) the porous silica particles have an initial pore volume of from about 1.70 cc/g to about 2.20 cc/g as determined by Barrett-Joyner-Halenda (BJH) method, wherein said composite silica particles comprise from about 55.0 wt % to about 65.0 wt % of said one or more waxes, based on a total weight of said composite silica particles; or
   (b) the porous silica particles have an initial pore volume of from about 1.20 cc/g to about 1.70 cc/g as determined by Barrett-Joyner-Halenda (BJH) method, wherein said composite silica particles comprise from about 45.0 wt % to about 55.0 wt % of said one or more waxes, based on a total weight of said composite silica particles; or
   (c) wherein the porous silica particles have an initial pore volume of from about 1.00 cc/g to about 1.20 cc/g as determined by Barrett-Joyner-Halenda (BJH) method, wherein said composite silica particles comprise from about 35.0 wt % to about 45.0 wt % of said one or more waxes, based on a total weight of said composite silica particles; or
   (d) wherein the porous silica particles have an initial pore volume of from about 0.60 cc/g to about 1.00 cc/g as determined by Barrett-Joyner-Halenda (BJH) method, wherein said composite silica particles comprise from about 25.0 wt % to about 35.0 wt % of said one or more waxes, based on a total weight of said composite silica particles; or
   (e) wherein the porous silica particles have an initial pore volume of from about 0.30 cc/g to about 0.60 cc/g as determined by Barrett-Joyner-Halenda (BJH) method, wherein said composite silica particles comprise from about 15.0 wt % to about 25.0 wt % of said one or more waxes, based on a total weight of said composite silica particles.

6. The matting agent of claim 1, wherein said composite silica particles have a total pore volume of less than or equal to about 0.19 cc/g, as determined by the RIH method.

7. The matting agent of claim 1, wherein said composite silica particles have a final particle surface area of from about 5.4 m²/g to about 9.0 m²/g, as determined by the BET nitrogen adsorption method.

8. The matting agent of claim 1, wherein said porous silica particles comprise silica gel, precipitated silica or fumed silica particles.

9. The matting agent of claim 1, wherein said porous silica particles have a median particle size of from about 1.0 micron (μm) to about 50.0 μm.

10. The matting agent of claim 1, wherein said composite silica particles are free-flowing particles.

11. The matting agent of claim 1, wherein when incorporated into a coating composition and applied onto a plain, smooth and non-penetrating black chart, enables the coating composition to form a clear coat film having a 60° gloss value between about 5.0 and about 25.0, as measured using a portable Micro-TRI-Gloss meter, wherein
(a) the clear coat film exhibits a water damage 24 hr ΔL* of less than 6.0 units, as measured using a portable Spectro-Guide 45/0 colorimeter, and/or
(b) the clear coat film exhibits a 50/50 water/ethanol damage 24 hr ΔL* of less than 6.5 units, as measured using a portable Spectro-Guide 45/0 colorimeter, and/or
(c) the clear coat film exhibits a 50/50 water/ethanol damage 1 hr ΔL* of less than 4.0 units, as measured using a portable Spectro-Guide 45/0 colorimeter, and/or
(d) the clear coat film exhibits a 50/50 water/ethanol damage 4 hr ΔL* of less than 4.5 units, as measured using a portable Spectro-Guide 45/0 colorimeter, and/or
(e) the clear coat film exhibits a film clarity ΔL* of less than 7.0 units, as measured using a portable Spectro-Guide 45/0 colorimeter.

12. The matting agent of claim 1, when incorporated into a coating composition and applied onto a substrate, enables the coating composition to exhibit a film clarity ΔL* of less than 7.0 units, as measured using a portable Spectro-Guide 45/0 colorimeter.

13. A coating composition comprising the matting agent of claim 1.

14. The coating composition of claim 13, wherein
(a) said coating composition comprises an aqueous composition, and/or
(b) said coating composition comprises up to about 50 wt % of said matting agent, based on a total weight of said coating composition, and/or
(c) wherein said coating composition, when applied onto a plain, smooth and non-penetrating black chart, forms a film having a 60° gloss value of from about 5.0 to about 25.0, as measured using a portable Micro-TRI-Gloss meter, and/or
(d) wherein the film of (c) exhibits a water damage 24 hr ΔL* of less than 6.0 units, as measured using a portable Spectro-Guide 45/0 colorimeter, and/or
(e) wherein the film of (c) or (d) exhibits a 50/50 water/ethanol damage 24 hr ΔL* of less than 6.5 units, as measured using a portable Spectro-Guide 45/0 colorimeter, and/or
(f) wherein the film of (c) or (d) exhibits a 50/50 water/ethanol damage 1 hr ΔL* of less than 4.0 units, as measured using a portable Spectro-Guide 45/0 colorimeter, and/or
(g) wherein the film of (c) or (d) exhibits a 50/50 water/ethanol damage 4 hr ΔL* of less than 4.5 units, as measured using a portable Spectro-Guide 45/0 colorimeter, and/or
(h) wherein the film of (c) or (d) exhibits a film clarity ΔL* of less than 7.0 units, as measured using a portable Spectro-Guide 45/0 colorimeter.

15. A substrate coated with the coating composition of claim 13, wherein said substrate comprises a wood substrate.

16. A method of preparing the matting agent of claim 1, said method comprising:
contacting porous silica particles with the one or more waxes so as to form the composite silica particles having a total pore volume of less than 0.20 cc/g as determined by the BJH method and a final particle surface area of less than 10.0 meters squared per gram ($m^2/g$) as determined by Brunauer Emmet Teller (BET) nitrogen adsorption method.

17. The method of claim 16, wherein said contacting step comprises:
(a) dissolving or dispersing one or more waxes in a solvent to form a suspension or dispersion;
incorporating the porous silica particles into the suspension or dispersion; and
removing the solvent from the suspension or dispersion to form the composite silica particles; or
wherein said contacting step comprises:
melting one or more waxes to form a molten liquid; and
incorporating the porous silica particles into the molten liquid to form the composite silica particles; or
wherein said contacting step comprises:
simultaneously mixing or milling (a) one or more waxes, and (b) the porous silica particles with heat to form the composite silica particles, and/or
(b) reducing the particle size of the composite silica particles to obtain composite silica particles having a final particle size of less than 100 microns (μm), optionally further comprising:
forming composite silica particles having a first particle size of less than about 500 microns (μm);
heat treating the composite silica particles at an elevated temperature for a heat treatment period of time;
allowing the heat-treated composite silica particles to cool; and
milling the heat-treated composite silica particles so as to result in a final particle size of less than about 100 μm;
wherein the composite silica particles are heat treated at an elevated temperature ranging from about 90° C. to about 140° C., and the heat treatment period of time ranges from about 1.0 hour (hr) to about 4.0 hr.

18. The method of claim 17, wherein said reducing step results in composite silica particles having a final particle size of less than about 45.0 μm.

19. A method of improving chemical resistance of a waterborne composition applied to a wood substrate, said method comprising: incorporating the matting agent of claim 1 into the coating composition; applying the coating composition onto at least one surface of a wood substrate to form a coating; and drying the coating to form a film on at least one surface of the wood substrate, optionally wherein said film is a clear coat film.

* * * * *